2,768,887
Patented Oct. 30, 1956

2,768,887

ABRASIVES

Jacob Paul Rosenberg, Karl Ferdinand Rosenberg and Ernst Stephan Rosenberg, Padiham, England No Drawing. Application March 19, 1954, Serial No. 417,514

Claims priority, application Great Britain March 23, 1953

16 Claims. (Cl. 51—309)

This invention relates to an electric furnace process for the manufacture of aluminous abrasives, and has for objects to provide a simple and economical process for such manufacture, and a composition of greatly improved abrasive qualities.

Abrasives have been prepared by fusing alumina or aluminous substances, with or without addition of compounds of other elements, in the electric arc furnace. A process of this kind in which chromium oxide is added to the alumina is described, for example, in United States specification No. 2,279,260. In these prior processes, arc furnaces having graphite or other carbon electrodes have been employed, the function of the arc being to generate the heat required for melting the charge, whilst avoiding introduction of carbon into the melt.

During the operation of the arc furnace, most of the charge is in the liquid state, by reason of the high temperature produced by the arc, which necessarily involves a very high power consumption. After the operation is concluded, a large proportion of the charge is still liquid, and possibly because of the slow crystallisation under these conditions, some separation of the components of the charge occurs, so that after solidification the mass shows an irregular structure, with non-uniform distribution of the components. We have found, in an arc furnace operating on a charge of alumina with 2½% of chromium oxide, that after complete solidifiaction the outer layers contained on the average 4½, the middle portion about 2½% and the inner portion an average of only 1½% of chromium oxide. The crystalline structure of the inner part, constitutiing about one third of the whole charge, was somewhat different from that of the remainder.

United States specification No. 659,926 describes a method of preparing an abrasive by fusing bauxite in an electric arc furnace of which the hearth could be gradually raised or lowered, in order to govern the rate of cooling of the charge and the nature of the crystallisation. The intense heat produced by the electric arc caused very rapid destruction of the furnace, it being frequently necessary to rebuild it after treating only one charge. The consumption of power was also very high, being of the order of 3,000 kw.-hrs. per ton of charge. Because of these difficulties, furnaces with water-cooled walls and having hearths which could not be moved vertically were adopted, though with these the power consumption was still high, being of the order of 2,000 to 3,000 kw.-hrs. per ton of charge, the cost of maintenance was very much lower, and furnaces of this kind were and are generally used.

We have now found that products of very much improved abrasive properties and of very uniform structure, and very much smoother and more economical furnace operation, especially with regard to power consumption, may be obtained if, instead of using the electric arc for heating, the resistance of a thin layer of the molten charge is employed as a source of heat. We therefore operate our furnace in such a way that an arc cannot be formed, and heat is supplied wholly by the current conducted by a thin layer of molten material supported on a bed of cooling solidified material.

The present invention thus resides in a process of manufacturing abrasive by melting alumina or/and aluminous substances in an electric furnace, in which the current is conducted by a thin layer of liquid supported on a surface of solidified material, the liquid being maintained in electrical contact with the furnace electrodes. By "aluminous substances" we means substances—such as bauxite—which have a high alumina content and do not contain impurities in such quantity as would adversely affect the quality of the abrasive.

In carrying out our invention, we may use alumina alone, or we may add chromium oxide, or a mixture of chromium oxide with chromium or chromium carbide, or both, and we may add carbon or cause carbon to enter the product by use of graphite or other carbon electrodes. If carbon infiltration is not desired, water-cooled metal electrodes may be used.

Abrasives produced according to the process of our invention possess abrading qualities superior to those prepared in the conventional manner; their crushing strength (hardness) is increased and their impact strength (toughness) may be varied according to the composition of the original mix.

Grinding wheels, grinding segments, and like abrasive articles, abrasive coated articles and abrasive powders and compounds prepared from abrasives according to the present invention, or mixtures of such abrasives with known abrasives, show substantially improved abrading qualities, giving higher resistance to wear and more expeditious cutting with less heat development. Furthermore, the volume of abrasive per cubic inch of wheel known in the grinding wheel industry as "structure" can be increased substantially, i. e. to an extent greater than conventionally known.

Other oxides as well as chromium oxide, can be utilized in the carrying out of our invention, for example, oxides of the following elements: iron, vanadium, beryllium, manganese, molybdenum, zirconium, titanium, boron, or silicon, mainly oxides of elements of which the tionic radii approximate to those of aluminum and which form oxides of the type $R_2O_3$ and $RO_2$, as well as the elements themselves or/and their carbides or mixtures of the oxides with the elements or/and carbides. Carbon may also be added if it is desired to ensure reduction. Where an element or a compound of an element other than aluminium is added to the charge, the amount will usually not exceed 5%, and will usual be considerably less. Hydrated alumina may also be used, alone or mixed with any of the above named substances; these mixtures are preferably first dried, though they may be melted without pre-drying. The latter operation, however, will result in somewhat turbulent furnace charges.

An electric furnace for carrying out our invention may comprise an insulated shell of iron or steel plate having a vertically displaceable floor or bottom and adjustably mounted electrodes. The electrodes are preferably graphite or carbon but water-cooled metal electrodes may be used if carbon infiltration is to be avoided. If infiltration of carbon is desired, carbon or graphite electrodes are used and are so mounted that the desired degree of infiltration is obtained. For example, when the electrodes are placed vertically and are of small diameter, the infiltration of carbon is small: if electrodes of larger diameter are selected, the infiltration of carbon is increased proportionately; the infiltration may be further enhanced by inclining the electrodes from the vertical, in the limit almost to a horizontal position, the infiltration of carbon being thus controlled by the size and angle of inclination of the electrodes.

In carrying out the process, the floor or bottom of the furnace is located initially in its raised or uppermost position, the furnace is charged with alumina with or without other constituents and the electrodes are adjusted so as to be in contact with the mass and close together. The flow of current between the electrodes, when the circuits are closed, is initiated by loose pieces of coke or graphite laid between the ends of the electrodes. As the mass commences to fuse, a conducting layer of liquid is formed. The furnace is then charged with a further quantity of the mixture to be melted so as to cover the electrodes and avoid heat losses. During the operation of the furnace, the flow of current is maintained constant, first by increasing the distance or gap between the electrodes as the area of the molten conductive layer grows, and secondly by lowering the floor or bottom of the furnace or/and by raising the electrodes. In consequence of this relative vertical movement, the fused material at the bottom of the layer begins to cool and solidify, and as the movement goes on, a solidifying mass builds up from the floor of the furnace. By these means, only a relatively small quantity of the mass in a thin layer is permitted to become liquid at any one time, and we believe that the valuable qualities of the abrasive obtained by the process of our invention are a result of this method of operation. During the operation of the furnace, only a relatively small proportion of the charge is in the liquid condition at any one time, and even that small proportion is in the fused state only for a short period. Thus, there exists a relatively shallow layer of molten substance resting upon a crystallising mass. The major portion of the mix thus crystallises whilst the current is still passing and the charge is still in the furnace. The thin layer of molten substance on the surface of the crystallising mass conducts the current, and is continuously in contact with the ends of the electrodes. In this manner the charge is heated solely by the resistance of this thin conducting layer to the current, and the temperature of the molten pool can be reduced to the minimum necessary for fusion. Heat losses are very much reduced with a resulting substantial economy in current consumption as compared with the arc process. Furthermore, as the zone of fusion is so small and so localised, there is no overheating of the furnace shell or lining, and maintenance costs are very low.

By way of example, we have used, in experimental practice, a 100 kw. furnace with a three-phase transformer giving an E. M. F. of 110 volts. After a few minutes of operation, the full load of the current (approximately 500 amperes) is attained. The load is maintained substantially constant by slowly withdrawing the electrodes so as to increase the distance or gap between their adjacent ends, the voltage and current being maintained constant. When the electrodes have been withdrawn to maximum separation, which may be from 25 to 30 inches or more, control of the current is achieved by lowering the floor or bottom of the furnace or/and by raising the electrodes, which has the effect of allowing the liquid on the hearth to cool and begin to crystallise. Additional charge is added to the furnace as the operation proceeds. In this manner, the current is conducted wholly by the shallow layer of liquid on the surface of the crystallising mass. The size and depth of this liquid layer after separation of the electrodes to the maximum extent remain substantially constant throughout the melting operation. Under these conditions, the consumption of power may be as low as 1200 kw.-hrs. per ton of abrasive produced.

Thus it will be seen that when a state of steady operation has been reached, the amount of material crystallising during any given time is substantially the same as the amount of material melting during that time. This state is reached when the electrodes have been drawn out to their limiting position, and relative vertical movement has begun. At this stage, the thickness of the liquid layer may be from ½" to 1½". It will be clear that under these conditions it would be quite impossible for an arc to be maintained between the electrodes. With the ends of the electrodes separated by a gap of 25 to 30 inches, arcing is impossible. Furthermore, the ends of the electrodes dip into the layer of liquid material resting on the surface of the crystallising mass and are wetted by the liquid, so that the liquid is maintained in electrical contact with the electrodes, and current flows smoothly and steadily at a substantially constant rate through the liquid layer.

If the charge itself is used as the furnace insulating medium, the shape of pig formed during the fusing operation will vary according to the number of electrodes used; i. e. with two electrodes, the pig will be roughly rectangular or oval, with three electrodes triangular, and so on: if the furnace be rotated slowly the pig will be of circular configuration.

The movements of the electrodes and/or the floor or bottom of the furnace to maintain the conditions hereinbefore described may, of course, be controlled automatically.

The toughness of abrasives prepared according to our invention can be varied within wide limits by varying the nature and quantity of the materials used other than alumina. The toughness may be determined experimentally by impact strength tests. For example, grains passing through a 42 mesh silk sieve, but retained on a 46 mesh silk sieve, may be subjected to steadily increasing weights falling from a height of one inch until the grains have been broken. Such tests have shown that brittle abrasives may be prepared from a mixture of alumina and between 1½% to 3% chrominum oxide.

Abrasives prepared from charges containing carbon, or to which carbon is allowed access, show under X-ray examination a smaller or larger quantity of graphite. If the infiltration of carbon has been substantial, the product may contain metal or metal carbide. It is believed that the valuable qualities of the abrasive obtained by the process of our invention may be due to some extent to the presence of free graphite or free metal or metal carbide.

A very tough abrasive may be prepared by our process from alumina to which has been added 0.01% to 1% of chromium oxide and 0.01% to 1% of titanium oxide. An abrasive of intermediate toughness can be made from alumina to which has been added 0.01% to 1% of zirconium oxide.

When crushed into grain form, abrasives produced by the process of our invention show a multitude of cutting facets and edges, and when utilised in the manufacture of grinding wheels, in known manner, such wheels exhibit improved abrading qualities, in that they show a higher resistance to wear and permit cooler and more expeditious cutting operations to be carried out than is practicable in the use of grinding wheels of conventional manufacture. Experiments have also shown that—as before stated—the structure (volume percent abrasive per volume of grinding wheel) of grinding wheels made from our abrasive can be substantially increased.

As examples, we mentioned centerless, external, internal, and form grinding wheels of vitrified bond. For a centerless wheel we incorporate at least 57% volume abrasive per wheel; for external and internal grinding at least 57% volume abrasive per wheel; and for form grinding, as much as 61% volume abrasive per wheel. Vitrified grinding wheels of usual manufacture have rarely more than 53% volume abrasive per wheel.

We claim:

1. Process of manufacturing abrasives consisting in melting an aluminous substance electrically by conducting an electric current through a thin liquid layer of said melted substance which is supported on a surface of solidifying and solidified substance, dipping current supplying electrodes into said liquid substance which electrodes are thereby wetted, maintaining said thin layer of the liquid substance by fusion of fresh substances therewith, and cooling and solidifying the substance from the bottom of the liquid layer so as to maintain the depth of the liquid layer substantially constant.

2. Process of manufacturing abrasives which consists in melting an aluminous substance in an electric furnace having a movable bottom and in which the charge is heated solely by the resistance of a thin conducting layer of melted aluminous substance whereinto the furnace electrodes are dipped and maintaining the flow of current through said liquid conducting layer at a substantially constant value by withdrawing said electrodes and by relative vertical movement between the floor of the furnace and the electrodes at a speed which maintains the depth of the liquid layer constant.

3. Process as claimed in claim 1, in which said thin layer of liquid is maintained at a depth of between ½ inch and 4 inches, when using 100 kw. of electricity.

4. Process as claimed in claim 1, in which said thin layer of liquid is maintained at a depth not exceeding 1½ inches, when using 100 kw. of electricity.

5. Process as claimed in claim 1, in which chromium oxide is added to the charge to be melted.

6. Process as claimed in claim 1, in which chromium carbide is added to the charge to be melted.

7. Process as claimed in claim 1, in which chromium oxide and chromium carbide are added to the charge to be melted.

8. Process as claimed in claim 1, in which carbon is added to the charge to be melted.

9. Process as claimed in claim 1, in which electrodes composed of carbon in one of its known forms are used for introducing carbon in said liquid substance.

10. Process as claimed in claim 1, in which metal electrodes are used.

11. Process as claimed in claim 1, in which the charge contains the oxide of at least one of the elements, iron, vanadium, beryllium, manganese, molybdenum, zirconium, titanium, boron, silicon.

12. Process as claimed in claim 1, in which the charge contains the carbide of at least one of the elements, iron, vanadium, beryllium, manganese, molybdenum, zirconium, titanium, boron, silicon.

13. Process as claimed in claim 1, in which the charge contains at least one of the elements, iron, vanadium, beryllium, manganese, molybdenum, zirconium, titanium, boron, silicon.

14. Process as claimed in claim 1, in which the charge is composed of a mixture of alumina and 1½% to 3% chromium oxide.

15. Process as claimed in claim 1, in which the charge is composed of a mixture of alumina with 0.01% to 1% chromium oxide and 0.01% to 1% titanium oxide.

16. Process as claimed in claim 1, in which there is added to the charge 0.01% to 1% zirconium oxide.

References Cited in the file of this patent

UNITED STATES PATENTS

| | | |
|---|---|---|
| 659,926 | Jacobs | Oct. 16, 1900 |
| 2,279,260 | Benner et al. | Apr. 7, 1942 |